(12) United States Patent
Franck et al.

(10) Patent No.: US 10,649,130 B2
(45) Date of Patent: May 12, 2020

(54) PEBBLE-PLATE LIKE LOUVRE WITH SPECIFIC DOMAIN CHARACTERISTICS

(71) Applicant: SIGNIFY HOLDING B.V., Eindhoven (NL)

(72) Inventors: Peter John Franck, Eindhoven (NL); Thomas Deflandre, Eindhoven (NL); Ronald Cornelis De Gier, Eindhoven (NL); Mark Johannes Antonius Verhoeven, Eindhoven (NL); James Jehong Kim, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/088,119

(22) PCT Filed: Apr. 13, 2017

(86) PCT No.: PCT/EP2017/058996
§ 371 (c)(1),
(2) Date: Sep. 25, 2018

(87) PCT Pub. No.: WO2017/182392
PCT Pub. Date: Oct. 26, 2017

(65) Prior Publication Data
US 2019/0107660 A1   Apr. 11, 2019

Related U.S. Application Data

(60) Provisional application No. 62/326,060, filed on Apr. 22, 2016.

(30) Foreign Application Priority Data

Jun. 14, 2016 (EP) .................................. 16174296

(51) Int. Cl.
F21K 9/00 (2016.01)
F21V 8/00 (2006.01)
(Continued)

(52) U.S. Cl.
CPC ................ G02B 6/005 (2013.01); F21K 9/62 (2016.08); F21V 7/09 (2013.01); F21V 11/06 (2013.01);
(Continued)

(58) Field of Classification Search
CPC .......... F21K 9/62; F21V 7/0083; F21V 7/041; F21V 7/09; F21V 11/06; F21V 11/08;
(Continued)

(56) References Cited

U.S. PATENT DOCUMENTS 2,166,646 A   7/1939   Sibbert
2,299,256 A   10/1942  Schultz
(Continued)

FOREIGN PATENT DOCUMENTS

CN   2672454 Y   1/2005
CN   1969203 A   5/2007
(Continued)

*Primary Examiner* — Gerald J Sufleta, II
(74) *Attorney, Agent, or Firm* — Daniel J. Piotrowski

(57) ABSTRACT

The present invention relates to a louvre lighting unit which contains a plurality of louvre cells for beam shaping the lighting unit light. The plurality of louvre cells comprises a plurality of n subsets, each comprising a respective plurality of m louvre cells. The louvre cells of each subset are configured as a domain of adjoining louvre cells, wherein a respective plurality of k louvre cells within each domain have mutually differing louvre cell cross-sections.

17 Claims, 4 Drawing Sheets

(51) Int. Cl.
  *F21V 11/06* (2006.01)
  *F21K 9/62* (2016.01)
  *F21V 7/09* (2006.01)
  *F21Y 115/10* (2016.01)

(52) U.S. Cl.
  CPC ......... *G02B 6/0018* (2013.01); *G02B 6/0068* (2013.01); *G02B 6/0096* (2013.01); *F21Y 2115/10* (2016.08)

(58) Field of Classification Search
  CPC ..... F21V 11/14; G02B 6/0018; G02B 6/0068; G02B 6/0096; G02B 6/005
  See application file for complete search history.

(56) References Cited

U.S. PATENT DOCUMENTS

| | | | |
|---|---|---|---|
| 3,313,832 A | 4/1967 | Deaton | |
| 3,313,932 A | 4/1967 | Dealton | |
| 4,471,596 A | 9/1984 | Deaton et al. | |
| 4,613,929 A | 9/1986 | Totten | |
| 4,882,662 A | 11/1989 | Prodell | |
| 5,683,175 A | 11/1997 | Golz | |
| 6,086,227 A | 7/2000 | O'Connell et al. | |
| 7,441,927 B1 | 10/2008 | Kling | |
| 8,757,849 B2 | 6/2014 | Brick et al. | |
| 9,086,521 B2 | 7/2015 | Rinehart et al. | |
| 2004/0130790 A1 | 7/2004 | Sales | |
| 2006/0203468 A1* | 9/2006 | Beeson ............... | G02B 27/286 362/84 |
| 2008/0211989 A1* | 9/2008 | Park .................. | G02F 1/133603 349/64 |
| 2009/0003002 A1* | 1/2009 | Sato .................... | G02B 6/0043 362/341 |
| 2011/0018012 A1* | 1/2011 | Tanaka ................ | F21V 3/00 257/89 |
| 2011/0044026 A1* | 2/2011 | Deeben ............... | H01L 33/508 362/84 |
| 2011/0235336 A1 | 9/2011 | Fritsch et al. | |
| 2012/0039084 A1* | 2/2012 | Eckhardt ............. | G02B 5/124 362/516 |
| 2012/0113679 A1* | 5/2012 | Boonekamp ......... | G02B 6/0068 362/607 |
| 2012/0120672 A1* | 5/2012 | Stagg .................. | B60Q 1/2607 362/510 |
| 2012/0176813 A1 | 7/2012 | Holten et al. | |
| 2013/0077345 A1* | 3/2013 | Sato .................... | G02B 6/0061 362/609 |
| 2013/0215643 A1 | 8/2013 | Hikmet et al. | |
| 2013/0223079 A1* | 8/2013 | Jung .................... | F21S 8/02 362/297 |
| 2014/0016181 A1 | 1/2014 | Dal Negro | |
| 2014/0016310 A1* | 1/2014 | Xie ...................... | F21V 5/007 362/231 |
| 2014/0078730 A1* | 3/2014 | Li ........................ | F21V 7/06 362/231 |
| 2015/0176810 A1* | 6/2015 | Mitchell .............. | F21V 13/04 362/293 |
| 2015/0267885 A1* | 9/2015 | Freier .................. | F21S 11/007 362/235 |
| 2017/0191637 A1* | 7/2017 | Gommans ............ | F21V 5/002 |
| 2018/0321553 A1* | 11/2018 | Robinson ............. | B60K 35/00 |

FOREIGN PATENT DOCUMENTS

| | | |
|---|---|---|
| CN | 102445721 A | 5/2012 |
| CN | 102472475 A | 5/2012 |
| CN | 102644897 A | 8/2012 |
| CN | 103168198 A | 6/2013 |
| CN | 103807804 A | 5/2014 |
| DE | 102010062454 A1 | 6/2011 |
| EP | 2523025 A2 | 11/2012 |
| JP | 04-036713 A | 2/1992 |
| JP | 08-45320 A | 2/1996 |
| JP | 2008210603 A | 9/2008 |
| JP | 2014115501 A | 6/2014 |
| WO | 2011033424 A1 | 3/2011 |
| WO | 2013017613 A1 | 2/2013 |
| WO | WO2015062829 A1 | 5/2015 |

* cited by examiner

PEBBLE-PLATE LIKE LOUVRE WITH SPECIFIC DOMAIN CHARACTERISTICS

CROSS-REFERENCE TO PRIOR APPLICATIONS

This application is the U.S. National Phase application under 35 U.S.C. § 371 of International Application No. PCT/EP2017/058996, filed on Apr. 13, 2017, which claims the benefits of European Patent Application No. 16174296.0, filed on Jun. 14, 2016 and U.S. Patent Application No. 62/326,060, filed Apr. 22, 2016. These applications are hereby incorporated by reference herein.

FIELD OF THE INVENTION

The invention relates to a louvre unit. The invention further relates to a lighting unit with louvres.

BACKGROUND OF THE INVENTION

Louvre containing luminaires are known in the art. U.S. Pat. No. 4,613,929, for instance, describes a troffer extension attachable to the walls of a lighting troffer, and with portions of a ceiling to raise the troffer relative to the ceiling, and having extension members, upper devices on one end of the members for engaging the troffer, and, lower devices on the other ends of the members for engaging the ceiling. In U.S. Pat. No. 4,613,929 the louvre is essentially a series of longitudinal and lateral metal strips interlocked in egg-crate fashion, defining a series of equally sized rectangular or square openings. The louvre is placed in the dead space beneath the lighting tubes, and has a lower edge which is generally flush with the plane of the ceiling.

SUMMARY OF THE INVENTION

Slim downlights are becoming more and more dominant on the market, because of their ease of mounting and integration in the overall building design. Key in such design may be the minimized height in relation to the diameter. The products may be provided with a large light emitting surface. Especially, such product may have a Lambertian light distribution and therefore may have a relative high luminance intensity at higher viewing angles.

Beam shaping of the light can be done by using e.g. TIR (Total Internal Reflection) elements that change the direction of the light. The size of the optic is directly related to the size of the source. So, if the total light emitting surface of a slim downlight is seen as one source, the optic element becomes very high in respect to the source, such that the required height of the lighting unit become too large (or the diameter or width becomes smaller than desired). A solution may be found in having multiple small light sources that have an individual optic in front, and together function as a whole. Since the source is made much smaller, the optic element can also be made much smaller. The problem then becomes how to create the small sources and how to align the sources to all the optics, also e.g. including thermal expansion effects. One can e.g. use a lot of individual LEDs but that may create a high risk in LED failure, difficult electrical systems to balance the current, and high cost for all the LEDs, etc.

It appears that a randomized look of a lighting product is highly appreciated by the customers for its look and feel. Regular patterns often are referred to as technical and not pleasant. A randomized look would require that every cell of the pattern is uniquely designed to achieve the optical function and be different from all the others. To fill the total surface in limited height a lot of cells are needed. This would require a lot of design and engineering work which is not cost effective. Using the same cell design may create the unpleasing technical look but would be easy to do. Moreover, having only one cell shape, meaning a classic layout of louvres will generate an artifact pattern in the beam and therefore on the illuminated plane, for instance the well-known honeycomb layout will create a hexagonal pattern and the outer edge of the beam will be pentagonal.

Hence, it is an aspect of the invention to provide an alternative lighting unit, which preferably further at least partly obviates one or more of above-described drawbacks, which may especially be relatively thin. It is further an aspect of the invention to provide an alternative louvre unit (for application to a(n existing) lighting unit), which may have a random appearance which is nevertheless relatively easy designable.

In embodiments, a solution is provided wherein with a plurality of unique louvre cells ("cells"), such as e.g. 13 unique cells, a louvre design is created. These unique cells are combined in a so-called tile (herein also indicated as "domain" or "subset"). This tile is used to fill the whole plate. With such arrangement, a randomized look and feel is created with only limited design and engineering work and this can be repeated for different product shapes and sizes.

In embodiments, a louvre unit can be designed by e.g. starting in the design phase with creating a rotational symmetric optic for generating the expected intensity beam. This optic is duplicated to have m (such as 13) individual reflectors close to each other for instance in a hexagonal array. As a final step, the shape of a number of the optics is changed from circular into k (such as 13) unique shapes. This reduces the dark areas in between the cells and increases the efficacy of the total optical system. In this step, it is possible to create the randomized look and avoid creating a technical pattern. Finally the tile can be duplicated (n times) to fill the whole surface. In such a way, a design can be created that can be used in producing light exit units with louvre cells.

Hence, in a first aspect the invention provides a louvre unit comprising a plurality of louvre cells for beam shaping the lighting unit light, wherein the plurality of louvre cells comprises a plurality of n subsets each comprising a respective plurality of m louvre cells, wherein the louvre cells of each subset are configured as domain of adjoining louvre cells, wherein a respective plurality of k louvre cells within each domain have mutually differing louvre cell cross-sections, wherein $3 \leq n \leq 100000$, wherein $5 \leq m \leq 21$, and wherein $5 \leq k \leq m$, wherein the louvre cells are formed as polygons bounded by a number Ne of louvre walls closing in a loop, wherein for each louvre cell the number Ne is in the range of $3 <= Ne <= 10$, wherein the plurality of louvre cells within the same domain only have C1 symmetry relative to the central point P in said domain and each domain comprises at least three polygons of incongruent shape, and wherein each louvre cell has a respective equivalent cross section, the mutual ratio between equivalent cross-sections of louvre cells is in the range of 1:2.5. The invention further provides a lighting unit (herein also indicated as "unit") comprising (i) a plurality of light sources for generation of lighting unit light, and (ii) a light exit unit for escape of at least part of said lighting unit light from the lighting unit, wherein the light exit unit comprises the louvre unit. With such unit, it is possible to achieve beam control out of a uniform lit surface in a limited height. Preferably the louvre cells form a tessellated surface of the domain, and/or the domains form a tessellated surface of the light exit window. Further preferably, the polygons have rounded corners. The expression "each domain comprises at least three polygons of incongruent shape" means that the louvre cells do not match in shape when enlarged to the same size. Rather this means that their shapes are different, for example in the number of louvre walls, i.e. that there are at least three polygons having a different number of louvre walls, for example the domain comprises at least one 3-sided, one 4-sided and one 8-sided polygon, or that the polygons in a domain all have the same number of louvre walls, for example are all 6-sided polygons but with mutually different lengths of the louvre wall forming a closed loop and with different angles between the louvre walls. Preferably a combination of the abovementioned features of an incongruent shape is applied, thus creating a very attractive (semi-)randomized look and feel.

Further by limiting the range of polygons from 3 to 10 sided and by limiting the range in equivalent cross-sections, a further improvement in pleasant semi-randomized design is provided, which is without the complexity of the manufacture of a fully randomized design and/or without the unpleasant feel of a fully randomized or too regular design. In other embodiments, the domains includes louvres cells, with the domain only having C1 symmetry, but with the domains ordered in a substantially regular structure. In such embodiments, all domains may be substantially equal.

Hence, in a relatively simple way a lighting unit may be provided that can e.g. be used for office lighting, which has a relatively thin body, and which can provide light with the desired glare properties. Such lighting unit may allow a low height of the lighting unit in respect to e.g. a length, a width or a diameter of the lighting unit. Further, such a lighting unit especially may be a slim or shallow lighting unit. Further, such lighting unit may allow an effective passive and/or active cooling. Such lighting unit may allow lighting of a closed or open space, such as a room, an office, a store, a shop window, etc. In embodiments (see also below), such lighting unit may be integrated in a ceiling or a wall. In other embodiments such lighting unit may be arranged in a (motorized) vehicle, especially allowing lighting a street or the inside of the vehicle, etc.

The expression "equivalent cross-sections of louvre cells" means the cross section of a circle having the same cross-sectional surface area of the (irregular) polygonal shape of the louvre cell.

As indicated above, the lighting unit comprises a plurality of light sources for generation of lighting unit light. Especially a light source may provide light source light. In specific embodiments, the light sources comprise solid state LED light sources (such as LEDs or laser diodes). The plurality of light sources especially may comprise a plurality of LED light sources. In embodiments, the plurality of (LED) light sources comprise one type of (LED) light source. In other embodiments, the plurality of (LED) light sources comprise at least two types of (LED) light sources configured to provide light source light with different spectral distributions, such as LEDs from different bins. For instance, blue LEDs and yellow LEDs, or blue LEDs and green LEDs and red LEDs may be provided. Such combination may be arranged to be able to provide white light. Especially, the colors of the different LEDs may be mixed in the light mixing chamber. Hence, the plurality of lights sources may include two or more subsets of light sources with each light source configured to provide substantially the same light (same spectral distribution), or with each subset configured to provide substantially the same light (same spectral distribution), or with two or more subsets configured to provide light with different spectral distributions. In embodiments, one or more light sources are configured to provide white light. In yet other embodiments, one or more subsets are configured to provide white light, and one or more other subsets are configured to provide colored light. In yet further embodiments, two or more subsets are configured to provide white light with different spectral distributions, such as having different correlated color temperatures. In such ways, in embodiments also the spectral distribution of lighting unit light, i.e. the light provided by the lighting unit, may be tunable. Hence, in yet further embodiments the lighting unit may comprise a control system configured to control one or more of the intensity of the light sources and the color of the light sources. In yet further embodiments, the control system may be configured to (thereby) control one or more of the intensity of the lighting unit light, the spectral distribution of the lighting unit light, and a beam shape of the lighting unit light.

The lighting unit light may essentially consist of the light source light. However, in embodiment also the lighting unit light may comprise converted light source light. For instance, the lighting unit may comprise a luminescent material that can be excited by the light source light. The luminescent material light (or converter light) may be comprised by the lighting unit light, optionally in combination with (some) remaining light source light. Therefore, the plurality of light sources are configured to generate lighting unit light, with the lighting unit light being generated directly (i.e. essentially light source light) and/or indirectly (due to conversion of at least part of the light source light into luminescent material light). For instance, a luminescent material may be comprised by walls, may be coated to faces, or may be embedded in a waveguide. Hence, in general the plurality of light sources is configured for generation of lighting unit light (directly (lighting unit light essentially consists of light source light) and/or indirectly (lighting unit light at least comprises luminescent material light)).

The lighting unit may be designed in all kind of ways. At least part of the lighting unit light escapes from the lighting unit via a light exit unit. The light exit unit is a kind of light exit window. The term "light exit unit" may also refer to a plurality of light exit units. The light exit window is especially configured to provide lighting unit light with a specific angular distribution (and/or beam shape). For instance, the light exit window may be configured to provide light with low glare. In embodiments, a beam of light may be provided with cut-off angles of 65° or smaller, wherein at angles larger than the cut-off angle, the luminance is equal to or smaller than 1000 $Cd/m^2$, such as equal to or smaller than 800 $Cd/m^2$. Also cut-off angles smaller, or optionally larger than 65° may be chosen, dependent upon the application. With the lighting unit, it may be possible to define the cut-off angle and/or the beam shape (of the lighting unit light).

The desired beam shape can be created with louvres. The use of louvres is known in the art (see also above). Louvres may e.g. include plates or strips which divide an exit window of a lighting unit in parts, herein also indicated as cells. Such cells have in general a square or rectangular cross-section. Further, in general such louvres have a certain height, defining the walls of the cells, with the cross-sectional shape substantially not changing over the height, though in embodiments there may also be a variation, such as an increase with increasing distance of the light sources (e.g. tapered). Due to the use of louvres, luminance at larger angles is reduced or substantially blocked. In prior art louvres, the louvres, and thereby the louvre cells are configured in regular patterns. In the present invention however, an irregular or especially a pseudo random pattern is used. In combination with a light guide (see also below), thin lighting units may be created that can be applied in all kind of applications, while having a small thickness (height) and having a pleasant appearance and good beam shaping properties.

The light exit unit is configured for escape of at least part of said lighting unit light from the lighting unit. The light exit unit comprises a louvre unit. Light of the lighting unit may substantially only escape from the lighting unit via the light exit unit. Especially, light of the lighting unit may substantially only escape from the lighting unit via the louvre unit. Hence, the light exit unit especially comprises a window that may essentially consist of a plurality of openings bordered by louvres. Each opening, confined by one or more louvres is indicated as louvre cell. Therefore the light exit unit comprises a plurality of louvre cells. Hence, the louvre unit provides the light emitting surface of the lighting unit.

The louvre cells may not be configured in a fully random pattern, but are especially also not configured in a fully regular pattern. To this end, the light exit unit comprises a plurality of n subsets each comprising a respective plurality of m louvre cells. The number of subsets is at least 3, such as least 5, even more especially at least 7, but may be much larger, such as e.g. up to about 100000, like up to about 10000, such as up to about 1000. The number of subset may depend upon the cross-sectional area of the light exit unit. Especially, the light exit unit comprises in the range of 0.05-100 louvre cells per $cm^2$ cross-sectional area, especially in the range of 0.01-50 louvre cells/$cm^2$, even more especially in the range of 0.01-10 louvre cells/$cm^2$, such as 0.05-10 louvre cells per $cm^2$, such as in the range of 0.1-5 louvre cells/$cm^2$. Each subset comprises a plurality of louvre cells. These louvre cells together form a subset or herein also called "domain" The domains or subset comprise louvre cells that are configured adjoined. The aggregate of a plurality of louvre cells thus form a domain. The louvre cells are especially configured in a 2D array of louvre cells. The domain may also be indicated as conglomerate of louvre cells or agglomerated louvre cells. Each louvre cell in such domain shares a wall (or louvre) with at least one other louvre cell. The domains are configured adjoined. The aggregate of a plurality of domains may thus especially form the louvre unit. Also the domains are especially configured in a 2D array of domains. The louvre unit may also be indicated as conglomerate of domains or agglomerated domains.

The subsets comprise a plurality of louvre cells that may be selected from a limited number of possible louvre cells shapes. In principle, domains may even differ from each other in number of louvre cells, arrangement of the louvre cells, number of louvre cells, but especially each subset comprise a plurality of louvre cells that may be selected from a limited number of possible louvre cells shapes. Even more especially, each subset comprises one or more, especially a plurality of louvre cells shapes that is represented in each domain. Even more especially each domain comprises the same number and same type and same configuration of louvre cells. Hence, in embodiments the light exit unit comprises a plurality of domains of which at least part of the total number of domains is substantially identical, such as 2 or more, or at least 5, like at least 10 domains. Note that at a border of the light exit unit the domains may contain less louvre cells then domains more remote from a border in order to provide the desired shape of the border (round, square, rectangular, oval, etc.).

As indicated above, the louvre cells may be selected from a limited number of possible louvre cells shapes. Hence, there may be plurality of k louvre cells having mutually differing louvre cell cross-sections. Each subset may include these k louvre cells. Optionally, in addition to these k louvre cells, the subset may also include other louvre cells which are not necessarily be represented in all other subsets. Hence, each subset comprises a respective plurality of m louvre cells, wherein a plurality of k louvre cells within each domain have mutually differing louvre cell cross-sections, with $5 \leq m \leq 21$ and $5 \leq k \leq m$. However, especially, all louvre cells within the subsets are selected from the number of predefined k louvre cell shapes. Hence, especially k=m. Further, especially both k=m with k being equal to or larger than 7.

Therefore, the lighting exit unit comprises a plurality of louvre cells for beam shaping the lighting unit light, wherein the plurality of louvre cells comprises a plurality of n subsets each comprising a respective plurality of m louvre cells, wherein the louvre cells of each subset are configured as domain of adjoining louvre cells, wherein a respective plurality of k louvre cells within each domain have mutually differing louvre cell cross-sections, wherein $3 \leq n \leq 100000$, wherein $5 \leq m \leq 21$, and wherein $5 \leq k \leq m$. In specific embodiments $n \geq 5$, $7 \leq m \leq 21$, and $7 \leq k \leq m$. In even more specific embodiments, $n \geq 5$, $9 \leq m \leq 21$, and $9 \leq k \leq m$. Especially, k is in the range of 7-17, with k=m. With such embodiments, a random appearance may be created, beam shaping may be well, while complexity can still be handled. In general, the higher m and the higher k, the more random the lighting unit (i.e. the louvre unit) may be perceived. Further, also beam shaping may be easier. However, the higher m and k, also the higher the complexity of the design. Hence, especially k=m, and especially k and am are (independently) in the range of 7-21, especially 7-21, such as even more especially 7-17, like below 15.

As indicated above, a plurality of louvre cells within a domain have mutually differing louvre cell cross-sections. The shape of the cross-section may be angular, but may also be rounded. Especially, rounded cross-sections may provide a kind of pebble structure. The mutually differing louvre cell cross-sections especially differ in at least one of surface area size and shape. For instance, two equilateral triangles only differing in size have identical shapes. Likewise, two circles only differing in diameter have identical shapes. However, a circle and a triangle (even when having identical area sizes) differ in shape. Therefore, it is herein referred to "pebbles" as a multitude of pebbles may not include identically shaped pebbles.

The light exit unit may especially be combined with a light guide, such as a waveguide or an air guide. The light sources may be configured to provide the light source light into the light guide. The lighting unit may be configured such that light may escape from the light guide only via a limited number of faces, such as a single face. Due to reflections, such as due to total internal reflection (TIR), a substantial part of the (lighting unit) light may only escape from the light guide via such face.

In embodiments the face may be the light exit unit. This may especially be the case when an air guide is applied. In yet other embodiments, when a waveguide is applied, a face of such waveguide may be used as light outcoupling face. In such embodiments the light exit unit may be configured downstream of such light outcoupling face.

Therefore, in embodiments of the lighting unit, the unit comprises a light mixing chamber, wherein the plurality of light sources are configured to provide light source light in the light mixing chamber, wherein the light mixing chamber comprises a light exit face for escape of (light source) light from the light mixing chamber, wherein the light exit face may be comprised said light exit unit or wherein said light exit unit is configured downstream of said light exit face. Hence, the plurality of light sources are configured to provide light source light in the light mixing chamber for providing said lighting unit light. The light escaping from the light mixing chamber may include light source light and/or luminescent material light. Therefore, the light sources are configured for generating lighting unit light.

As indicated above, in some embodiments an air guide is configured as the light mixing chamber, and the light exit face is comprised said light exit unit. The light mixing chamber in embodiments contains air. Herein, the term "air guide" may also be used in relation to the "light mixing chamber" for embodiments comprising air. Hence, in embodiments the volume defined by the light mixing chamber is essentially filled with air. Especially, the light source light provided by the light sources may be guided by the air guide from the light sources to the chamber openings (i.e. first louvre cell openings; see also below), directly and after (internal) reflection.

In yet other embodiments, a waveguide is configured as the light mixing chamber, wherein the waveguide comprises said light exit face, and wherein said light exit unit is configured downstream of said light exit face.

Herein, an air guide is a light guide wherein air (or optionally another gas) is the medium wherein the light propagates. Further, herein a waveguide is a light guide wherein a solid (or optionally liquid) material is the medium wherein the light propagates.

The terms "upstream" and "downstream" relate to an arrangement of items or features relative to the propagation of the light from a light generating means (here the especially the light source), wherein relative to a first position within a beam of light from the light generating means, a second position in the beam of light closer to the light generating means is "upstream", and a third position within the beam of light further away from the light generating means is "downstream".

The light guide may also be indicated as "light mixing chamber". Especially, in embodiments the light mixing chamber comprises one or more faces, especially two faces, and especially an edge face. Hence, in embodiments the lighting unit comprises a "light mixing chamber", also herein referred to as "(light) mixing box". In the light mixing chamber, especially light source light provided by the plurality of light sources is mixed. At least part of the light source light provided by a light source may be reflected (see also below) in the light mixing chamber, e.g. at a location of a face and/or the edge face and may mix with light source light from another light source (or from the same light source light). Hence, the light mixing chamber may mix light source light of light sources which have substantially identical spectral distributions or which differ in spectral distributions.

In further embodiments, the plurality of light sources comprise light emitting faces, such as LED dies. Hence, in embodiments, the plurality of light sources comprise light emitting faces, wherein the light emitting faces are configured within the light mixing chamber.

The light mixing chamber may in embodiments be defined by faces and an edge face. The faces and the edge face may comprise different kind of shapes. For instance, the faces may comprise a rectangular shape, a circular shape, an elongated shape, a curved shape, an undulating shape, a square shape, etc. The faces may also comprise multiple shapes and/or the different faces may comprise different shapes. Likewise, the edge face may comprise different kinds of shapes, such as mentioned before in relation to the faces. Especially, the edge face is arranged between (part of) an edge of a first face and (part of) an edge of a second face, especially to define the (light mixing) chamber. In embodiments, the light mixing chamber may comprise a "free" shape. The light mixing chamber comprises at least two faces and an edge face. In embodiments, the edge face may comprise multiple edge faces, such as two edge faces, three edge faces (such as for a chamber with a triangular cross section), four edge faces (such as for a chamber with a square or rectangular cross section). In embodiments, the light mixing chamber comprises exact two faces and an edge face (such as for a chamber with a circular or oval cross section). In other embodiments the light mixing box comprises more than two edge faces.

In embodiments, the faces are arranged substantial parallel (which includes parallel curved faces).

In further embodiments, two faces comprise a circular shape and the edge face comprises a cylindrical shape. Especially, the faces are configured parallel to each other and the edge face is located between the edges of the faces. In such embodiments, the light mixing chamber may comprise a disk-like shape. Especially in such disk-like shaped light mixing chamber, the distance between the faces may substantially be the same over the light mixing chamber and a height of the light mixing chamber may be equal to the distance between the faces. Likewise, the first length of this disk-like shaped light mixing chamber may be equal to the maximum distance of a line connecting a first location at the edge of a face to a second location at the edge of said face, especially equal to the diameter of the faces.

In other embodiments, two faces (especially arranged parallel to each other) comprise an elliptical shape having a major axis (or transverse diameter) and a minor axis (or conjugate diameter), and the first length of the light mixing chamber may be equal to the length of the major axis (especially when faces are configured such that a line connecting the center of the first face and the center of the second face is perpendicular to the major and minor axis).

In yet other embodiments, a first face is curved and a second face is a flat face. Especially, in such embodiments the (shortest) distance (height) between a first location at the first face and a second location at the second face may depend on the position of the location(s).

Especially, the light mixing chamber has a (flat) disk-like or (flat) plate-like shape.

The light mixing chamber may have a first length and a height. The first length of the light mixing chamber may especially be defined by a characteristic distance, such as a width, a length or a diameter. Hence, the term "first length" may refer to one or more of a length, a width, a diameter, a transverse diameter, a conjugate diameter, etc. In embodiments wherein a length, a width, a transverse diameter, or a conjugate diameter is chosen as first length, a second length may be chosen from a width, a length, a conjugate diameter or a transverse length, respectively. In yet other embodiments, as first length a diagonal is selected (especially when faces are configured such that a line connecting the center of the first face and the center of the second face is substantially perpendicular to the major and minor axis).

Hence, in embodiments the light chamber may have a disc-like shape or a beam-like shape, or a plate-like shape, etc. Especially, one or more of the faces, even more especially both faces, are substantially flat. Especially, the edge may be curved and/or consist of two or more square or rectangular elements.

Especially, a height of the light mixing chamber is smaller than a first length of the light mixing chamber. In embodiments, the ratio of the first length of the light mixing chamber and the height of the light mixing chamber is selected from the range of 200:1-1:1, especially 200:1-2:1, such as 150:1-5:1, especially 100:1-10:1. In further embodiments, the first length is selected from the range of 20 mm-2000 mm, such as 50 mm-1000 mm, especially 50 mm-500 mm. In yet further embodiments, the height of the light mixing chamber is selected from the range of 2 mm-100 mm, such as 2 mm-50 mm, especially 5 mm-40 mm, even more especially 5 mm-25 mm, such as 5 mm-20 mm, especially 5 mm-10 mm. In further specific embodiments, the height of the light mixing box is selected from the range of 15-20 mm. Especially, the lighting unit, more especially the light mixing chamber, has a ratio of the first length (L1) to the height (H) of $1 \leq L1/H \leq 100$, such as $2 \leq L1/H \leq 100$, even more especially $5 \leq L1/H \leq 100$. With ratios of 2 or larger, such as especially 5 or larger, relatively thin chambers, and thus also lighting units may be created. Therefore, in embodiments the light mixing chamber comprises one or more faces and an edge face, with the light mixing chamber having a height (H) smaller than a first length (L1) of the light mixing chamber.

In embodiments, the height of the light mixing chamber may vary over the first length and/or the (first) length may vary over height of the light mixing chamber. The above indicated ratios may especially refer to maximum height and lengths. Further, the above indicated dimensions refer to distances between faces, and thus especially refer to the dimensions of the cavity or chamber defined by the faces and edge face. However, in embodiments the external dimensions of the lighting unit may also be selected from above values and/or ratios, especially from such ratios.

In embodiments, at least part of the total number of light sources are configured at (at least one of) the faces (including the edge face).

Assuming a waveguide, note that downstream of one or downstream of both faces (a) light exit unit(s) may be configured; i.e. one or both faces are light exit faces, respectively. However, in other embodiments, only downstream of one face the light exit unit is configured, with at the other (opposite) face, or downstream thereof, e.g. reflective material to keep or redirect the light in(to) the waveguide. In yet other embodiments, the light sources are configured at a face opposite of the light exit face (with thereof the light exit unit).

Assuming an air guide, in embodiments the light sources are configured at a face opposite of the light exit face (comprising the light exit unit). In such embodiments, the light sources may especially be configured to provide light source light with optical axes perpendicular to such face and in a direction away from such face, thus especially to the light exit face.

In yet further embodiments, the light sources are configured at the edge face, with specially the light sources configured at the edge face configured to provide the light source in a direction into the light mixing chamber facing away from the edge face.

Hence, in embodiments, the plurality of light sources are configured at the edge face and are configured to provide said light source light having an optical axis transverse to the height.

Combinations of two or more of such embodiments may also be applied (see also below).

Especially, the lighting unit comprises at least two, even more especially at least 4, yet even more especially at least 8, yet even more especially at least 10 light sources, even more especially 16 light sources, such as especially at least 30, even more especially at least 56. The number of light sources may be related to the (surface) area of a face. Especially high numbers, such as at least 10, especially at least 30, of light sources may be advantageous for a uniform distribution of light source light escaping from the light mixing chamber. Especially, a lower number of light sources may be cost efficient. In embodiments (only) 1-4 light sources are provided. The total number of light source lights may be a compromise between cost, availability, lifetime, uniformity and light output. Especially, the number of light sources may be proportional to the (surface) area of a face (of the light guide). In embodiments, the number of light sources per $m^2$ area of (one of the) face(s) is selected in the range of $10-500/m^2$, especially $50-500/m^2$, such as $100-400/m^2$, even more especially in the range of $150-300/m^2$.

The provided light source light travels away from the light sources and may be redirected such as reflected in the light mixing chamber, especially by a face (including the edge face). The redirected (reflected) light (again) may travel towards a face and be redirected (reflected) again in the light mixing chamber. Due to total multiple reflections (redirections) (inside the light mixing chamber), light may travel through the light mixing chamber until it escapes from there via an opening in the louvre.

In embodiments, a face may comprise a smooth surface to redirect light. Especially, the faces, including the edge face, comprises a light reflective material, such as a light reflective coating. Alternatively or additionally, an element such as a wall element or edge providing a face or edge face may substantially consist of reflective material. An example of a reflective material is e.g. microcellular formed polyethylene terephthalate (MCPET) or microcellular foamed sheet made from polycarbonate resin (MCPOLYCA). Also coatings of e.g. $Al_2O_3$, MgO, $BaSO_4$, etc., may be applied. In embodiments a face may comprise a (highly) diffuse reflective (white) layer.

In further embodiments, a face may comprise a rough surface to redirect the light. Especially, a face may comprise one or more structures, especially a plurality of structures, to provide a reflection in different directions. Especially, the light source may be redirected (reflected) in different directions. Hence, in embodiments, the light mixing chamber comprise other elements or structures configured to redirect the light source light. The elements or structures may especially be configured at the face(s) and/or the edge face, especially (edge) faces that are not configured as light exit face. Examples of such elements are reflective elements, and may be configured as e.g. dots or stripes, and may be configured in patterns. The elements for instance may have been provided by 3D printing at the faces (including the edge face) and/or during manufacturing of the light mixing box. Especially, at least one of the faces comprises elements configured to redirect light source light within the light mixing chamber. These elements may have the function of secondary light sources. Such elements may have heights and/or widths for instance in the range of up to about 5% of the height, such as 0.01-2% of the height of the light mixing chamber. The length of such elements may be in the range of the first length, but may also be in the range of up to about 5% of the height, such as 0.01-2% of the height of the light mixing chamber. Further, such elements may be configured in regular patters, irregular patters, or a pseudo random pattern. With the present invention, there is no necessity that the (redirection) elements are aligned with the louvre cells. Hence, in embodiments the elements have a fully regular pattern or have another pattern that is not aligned with the louvre cells.

The louvre cells may be configured in different type of patterns. Also combinations of patterns may be used. For instance, the configuration may be cubic or hexagonal. Especially, it appears that such highly symmetric patters are perceived less desirable. Hence, in embodiments the louvre cells are configured in a pseudo random pattern. Even more especially, the beam shaping elements are configured in a phyllotaxis pattern, even more especially a phyllotaxis spiral pattern.

In specific embodiments, the light exit unit has a cross-sectional area having a central point, wherein the plurality of louvre cells comprised by the light exit unit only have C1 symmetry relative to the central point. In other embodiments, the domains includes louvres cells, with the domain only having C1 symmetry, but with the domains ordered in a substantially regular structure. In such embodiments, all domains may substantially be equal, with within each domain a plurality of louvre cells having mutually different cross-sections.

The lighting unit can be relatively thin. The light mixing chamber or light guide can be relatively thin, but also the louvre cells can have small heights. In embodiments, the louvre cells have louvre heights (h1) selected from the range of 1-100 mm, such as in the range of 1-20 mm, like 1.5-15 mm.

Further, not only may the louvre cells (i.e. louvres or louvre walls) be relatively short (small height), also the thickness may be relatively small (thin). This leads to a low dead volume. In embodiments, the total area of the cross-sectional areas of louvre cells is in the range of at least about 70%, such as especially at least about 80%, even more especially at least about 90% of the area of the face comprising the louvre cells. Walls between adjoining louvre cells may include in the range of 0.1-30%, such as 0.1-20%, such as 0.2-10%, of a total surface area defined by a (virtual) plane defined by the louvre cells (this (virtual) plane may have an area substantially identical to the area of a face of a light guide of which downstream the light exit unit is configured). Hence, in embodiments, the light exit unit, especially the louvre unit, has a cross-sectional area, wherein the light exit unit comprises in the range of e.g. 0.05-10 louvre cells per cm$^2$ cross-sectional area (see also above). In yet further embodiments, the part of the light exit unit occupied by louvre walls defined by adjoining louvre cells is selected from the range of 9-17% of the cross-sectional area. The louvres may have thickness selected from the range of 0.1-10 mm, especially selected from the range of 0.2-5 mm, such as selected from the range of 0.5-4 mm, like equal to or lower than 2 mm.

Especially, the louvre cells have equivalent diameters selected from the range of 0.2-20 mm, such as 1-15 mm. Herein, the equivalent diameter for a given louvre cell (having a non circular cross-section) is defined as being equal to the diameter of a circle having the same area as the given louvre cell. Here, the term "area" especially relates to a cross-sectional area (with the cross-section in the plane (of the respective face)). Note that in embodiments one or more, or even all louvre cells within a domain have mutually differing equivalent diameters. However, in (other) embodiments also two or more louvre cells within a domain may have substantially identical equivalent diameters.

The louvre walls may be substantially flat in a direction substantially perpendicular to a cross-section. However, the louvre walls may also, over at least part of their height, include a tapering. The louvre cells may comprise a first louvre cell opening, for receipt of light (escaping from the light mixing chamber) and further comprising a second louvre cell opening for escape of (beam shaped light). The first louvre cell opening is configured upstream of the second louvre cell opening. The first louvre cell opening may be smaller than the second louvre cell opening. In this way, additional beam shaping (collimating) functionality may be added to the light exit unit. For instance, louvre cells may have a first equivalent diameter at the first louvre cell opening and a second equivalent diameter at the second louvre cell opening having a ratio R12 in the range of 0.5-1.1 with R12≠1, especially 0.5<=R12<1, yet even more especially 0.9<=R12<1. As indicated above, the louvre cells have e.g. equivalent diameters selected from the range of 0.2-20 mm, such as 1-15 mm. The first and second equivalent diameters will especially both be selected from this range (but may thus mutually differ). The second louvre cell openings may thus be configured in a 2D array, which especially provides light emitting surface.

Hence, thin lighting units may be created, with desirable beam properties. In embodiments, the lighting unit may have a lighting unit length (L3) and a lighting unit height (H3) with a ratio of the lighting unit length (L3) to the lighting unit height (H3) of 1≤L3/H3≤100, especially 2≤L3/H3≤100, yet even more especially 5≤L3/H3≤100. As indicated above, with ratios equal to or larger than 2, even more especially of at least 5 the unit can be very slim. Such units may thus include likewise slim light mixing chamber, which may substantially have the same ratio of dimensions. Though the light mixing chamber and/or the lighting unit being slim, a large light emitting surface may be provided.

Therefore, as indicated above in specific embodiments the lighting unit comprises at least 10 light sources, wherein the light sources comprise solid state light sources, wherein the louvre cells have louvre heights (h1) selected from the range of 1-100 mm, wherein the light exit unit has a cross-sectional area, wherein the light exit unit comprises in the range of 0.05-10 louvre cells per cm$^2$ cross-sectional area, wherein the part of the light exit unit occupied by louvre walls defined by adjoining louvre cells is selected from the range of 9-17% of the cross-sectional area. The area occupied by the louvre walls in the case of non-straight walls will be the area occupied by the walls at the first louvre cell opening.

The louvres according to the invention may comprise reflectors. In embodiments, the reflectors comprise a metallic (mirror) material, such as a metallic layer. In further embodiments, a surface of a reflector may be metalized, especially to create a specular reflective surface. In further embodiments, the reflector may comprise a reflecting paint. As indicated above, the louvre cells may comprise a first louvre cell opening, for receipt of (light) source light (escaping from the light mixing chamber) and further comprising second louvre cell openings for escape of (beam shaped light), especially wherein a reflective face is configured between a first louvre cell opening and a corresponding second louvre cell opening. In embodiments, at least part of louvre cell faces configured between said first louvre cell openings and said second louvre cell openings comprise a reflective material, especially a metallic mirror material. The louvre cell walls may also comprise a polymeric material that is coated with reflective material, such as indicated above.

The walls of the louvre cells maybe straight or tapering. The louvre cells may have heights H2 and lengths L2, with a ratio of H2/L2 being >=0.5, preferably >=0.8, more preferably >=1.2, e.g. H2/L2=1. As the length L2 will vary over the cross-section, herein the parameter "equivalent diameter" is used, which is simply taken as the average of the diameters of the first louvre cell opening and the second louvre cell opening.

The light mixing chamber may comprise wall elements comprising said face(s) and, edge face, such as to provide an air guide. The lighting unit may also include wall elements enclosing a waveguide, with at least part of the wall elements configured as light exit unit. At least part of the lighting unit, such as a wall element comprising the louvre cells, or a separate element comprising louvre cells, etc. may be provided by one or more of 3D printing and injection molding. Hence, in embodiments a face comprising said plurality of louvre cells and at least part of the edge face are comprised by a single unit. An integration of two or more of the elements of the lighting unit may also useful in view of thermal management. The open structure, especially in the case of an air guide, of the lighting unit may also add to thermal management. Through the louvre cells the light mixing chamber, such as the air guide or waveguide, may be in fluid contact with its environment. Hence, natural convection may help in temperature control of the lighting unit. In yet further embodiments, the lighting mixing chamber, assuming an air guide, further comprises one or more air openings, especially configured at one or more of the edge face and a face not facing the plurality of louvre cells. For instance, air may enter via such opening(s) and heated air may escape via the louvre cells. However, this may also be the other way around, with air entering via the louvre cells and heated air escaping via the air openings. Flow of air may also vary over the first length and/or height of the chamber. In yet further embodiments, the lighting unit further comprises an air flow generating device, such as a small pump, an (air) ventilator, an air jet, a venturi, etc., configured to provide an air flow within at least part of the lighting unit, such as in or around the light mixing chamber. In further embodiments, one or more of the edge face and the face comprising the plurality of louvre cells comprises a thermally conductive material. For instance, at least part of the lighting device may comprise aluminum, or another thermally conductive material, such as steel, cupper, magnesium, a heat conducting plastic, etc.

The lighting unit may be part of or may be applied in e.g. office lighting systems, household application systems, shop lighting systems, home lighting systems, accent lighting systems, spot lighting systems, theater lighting systems, fiber-optics application systems, projection systems, self-lit display systems, pixelated display systems, segmented display systems, warning sign systems, medical lighting application systems, indicator sign systems, decorative lighting systems, portable systems, automotive applications, (outdoor) road lighting systems, urban lighting systems, green house lighting systems, horticulture lighting, or LCD backlighting. The term white light herein, is known to the person skilled in the art. It especially relates to light having a correlated color temperature CCT between about 2000 and 20000 K, especially 2700-20000 K, for general lighting especially in the range of about 2700 K and 6500 K, and for backlighting purposes especially in the range of about 7000 K and 20000 K, and especially within about 15 SDCM standard deviation of color matching from the BBL black body locus, especially within about 10 SDCM from the BBL, even more especially within about 5 SDCM from the BBL.

BRIEF DESCRIPTION OF THE DRAWINGS

Embodiments of the invention will now be described, by way of example only, with reference to the accompanying schematic drawings in which corresponding reference symbols indicate corresponding parts, and in which:

FIGS. 2a-2b schematically depict some further embodiments and aspects of the light exit unit, with FIG. 2b showing (a variant of) a detail of FIG. 2a.

The schematic drawings are not necessarily to scale.

DETAILED DESCRIPTION OF THE EMBODIMENTS

A solution herein proposed is to create a beam shaping element, which is e.g. in embodiments made out of a good thermal conductive material such as aluminum, which is placed on the (large) light emitting surface of the luminaire. Hence, the louvre walls may be of aluminum, etc. (see also above). This surface is typically facing downwards to the room when installed at the ceiling. This beam shaping element may in embodiments be made such that it is in good thermal contact with the LED's, so that the heat generated by the LED's can go into the beam shaping element. Because of its relative large surface, a good heat exchange can be realized to the ambient air. The element in front of the light emitting surface does not have to have a beam shaping function per se, but can also be a decorative element with straight walls so that the light may only be affected minimally.

Figure 1A:
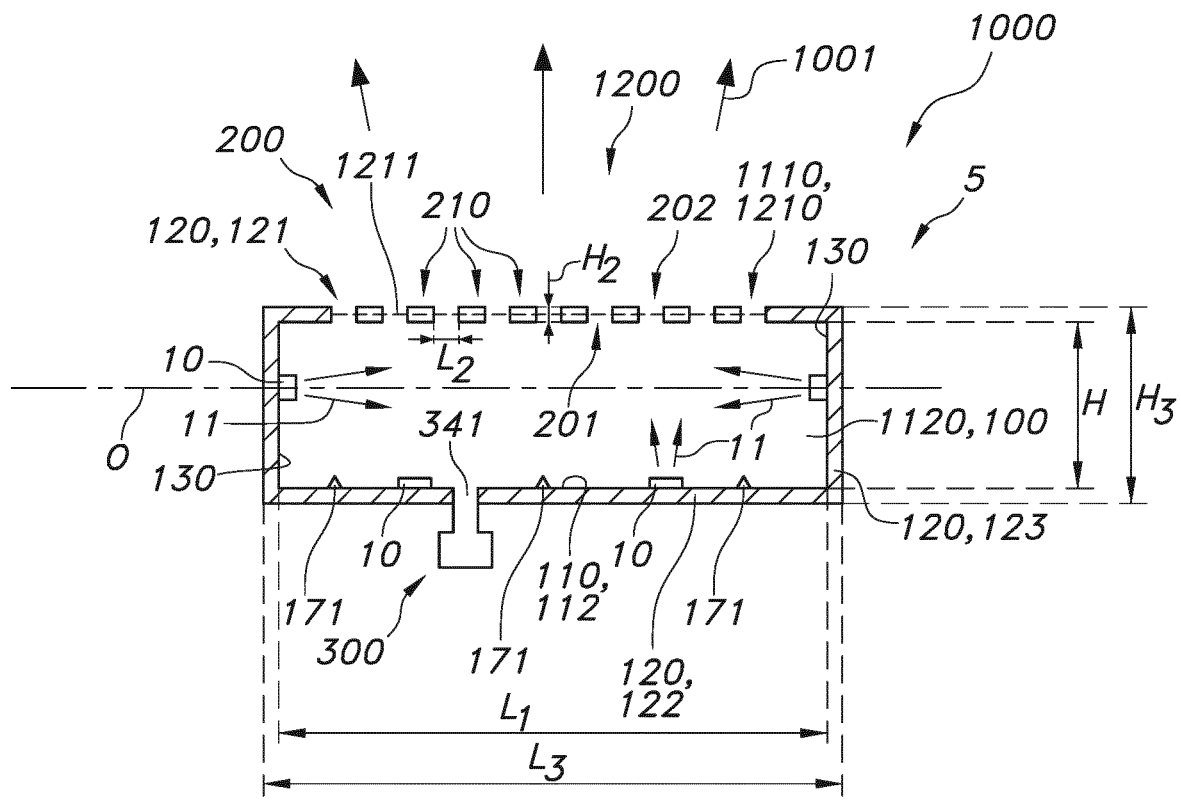
FIGS. 1a-1c schematically depict some embodiments and aspects of a lighting unit.
Figure 1B:
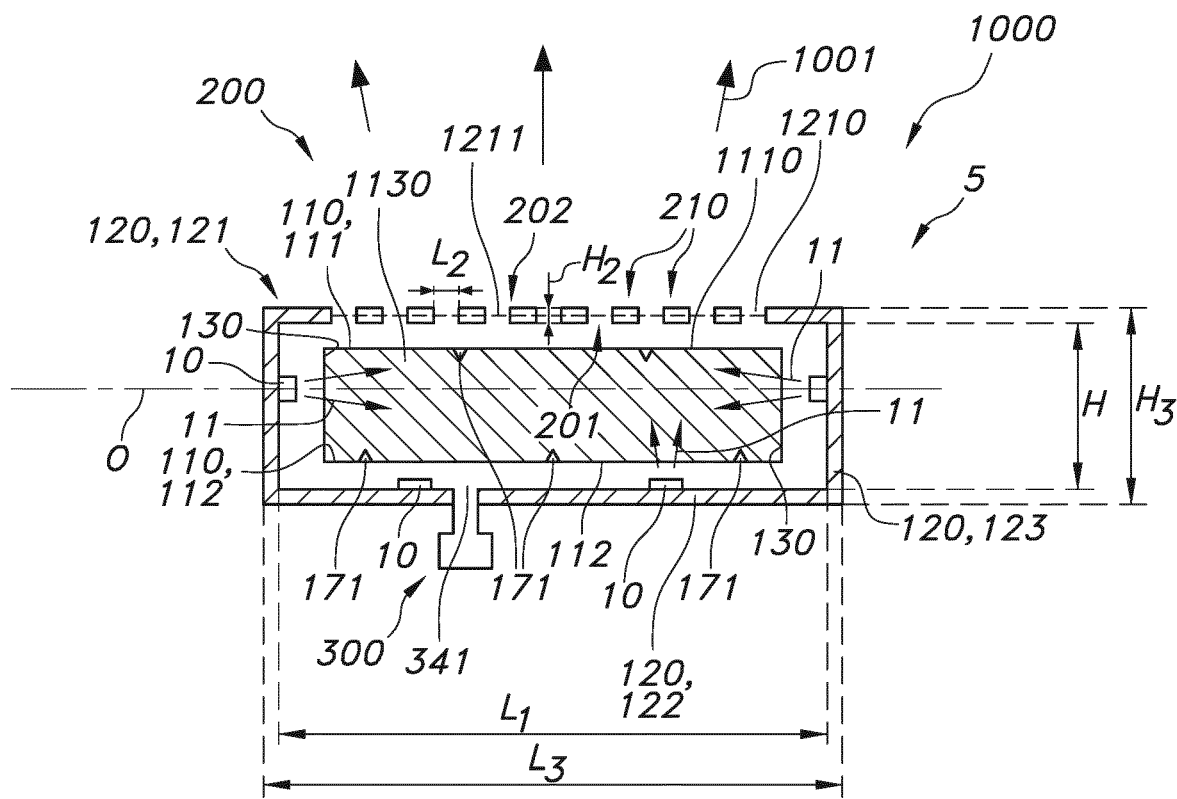

FIGS. 1a and 1b schematically depict in cross-sectional views, some embodiments of a lighting unit 1000 comprising a plurality of light sources 10, for—in use—generation of lighting unit light 1001. Further, the lighting unit 1000 comprises a light exit unit 200 for escape of at least part of said lighting unit light 1001 from the lighting unit 1000.

The light exit unit 200 comprises a louvre unit 1200 comprising a plurality of louvre cells 210 for beam shaping the lighting unit light 1001.

The lighting unit comprises a plurality of light sources 10 configured to provide light source light 11 in the light mixing chamber 100. Especially, the light sources comprise LEDs. Here, by way of example only four light sources 100 are depicted, but in general much more light sources may be available, such as at least 10, like at least 20.

The lighting unit 1000 may include wall elements 120, including the light exit unit 200 may define the lighting unit 1000. The wall elements 120 including the light exit unit 200 may define a lighting chamber 100, such as an air guide 1120 (FIG. 1a). The wall elements 120 and light exit unit 200 may also define a chamber enclosing a wave guide 1130 (FIG. 1b). The wall elements 120 are here also indicated as edge wall element 123, second wall element 122, and first wall element 121.

In FIG. 1a, the edge wall element 123 defines an edge face 130 which may be reflective. Wall element 122 defines a second face 112 which may also be reflective. Wall element 121 is essentially the light exit unit 200, which defines a light exit unit first face 1210. This face is in this variant also indicated as light exit face 1110. Here, the wall elements define an air guide 1120, which is here a mixing chamber 100. In the embodiment schematically depicted in FIG. 1*a*, the light exit face 1110 is comprised said light exit unit 200. In this variant, the light exit unit first face 1210 (substantially) coincides with the first face 111 or light exit face 1110.

In FIG. 1*b*, the wall elements 121,122,123 enclose a waveguide 1130. Here, the waveguide 1130 is a mixing chamber 100. The mixing chamber is defined by faces 110, with a first face 111, a second face 112 and an edge face 130. In this variant, faces 112 and 130 may be reflective for light. Face 111 may be transmissive for light. First face 111 is in this variant also indicated as light exit face 1110. Here, the light exit unit 200 is configured downstream of the first face 111 of the light mixing chamber 100. In this variant, the light exit unit first face 1210 does not coincide with the first face 111 or light exit face 1110.

In the former variant, FIG. 1*a*, the light in the air guide can escape from the chamber via the openings, i.e. the louvre cells 210. In the latter variant, FIG. 1*b*, the light in the waveguide 1130 can escape from the first face 111 or light exit face 1110 and then escape from the lighting unit 1000 via the light exit unit 200, more especially the louvre unit 1200.

Here, by way of example the walls of the louvre cells 210 are straight. The louvre cells may have heights H2 and lengths L2. As the length L2 will vary over the cross-section, herein the parameter "equivalent diameter" is used (see also FIG. 1*c*).

The chamber 100 has a height H and a first length L1. Further, the lighting unit 1000 has a third height H3 and a third length L3. As indicated above in relation to the first length, also applies to the third length. Hence, the term "third length" may refer to one or more of a length, a width, a diameter, a transverse diameter, a conjugate diameter, etc. In embodiments wherein a length, a width, a transverse diameter, or a conjugate diameter is chosen as third length, a further length may be chosen from a width, a length, a conjugate diameter or a transverse length, respectively. In yet other embodiments, as third length a diagonal is selected (especially when faces are configured such that a line connecting the center of the first face and the center of the second face is perpendicular to the major and minor axis).

Further, this drawing schematically shows an embodiment wherein at least one of the faces 110 comprises elements 171 configured to redirect (light source) light within the light mixing chamber 100. These elements are schematically depicted as triangular structures, such as tetrahedral or triangular ridges.

Yet further, these drawings schematically show embodiments wherein the lighting unit 1000 further comprises one or more air openings 341. The air openings 341 may be configured such that escape of light via such openings is minimized Especially, the accumulated cross-sectional area of such air openings is (substantially) smaller than the accumulated cross-sectional area of the first louvre cell openings 201 (for escape of lighting unit light 1001). Air may be sucked via one or more of such air openings, but also via one or more of the louvre cells. In this way, air may flow in the chamber 100 (FIG. 1*a*), or in the lighting unit 1000) and also escape there from, which assists in thermal management.

Even yet further, these drawings schematically show an embodiment further comprising an air flow generating device 300 configured to provide an air flow (within the light mixing chamber 100 in the embodiment of FIG. 1*a*). Especially, the air flow generation device is in (direct) fluid contact with the one or more air openings 341.

Hence, there may be a fluid communication between the chamber 100 and the external 5 of the lighting unit 1000, with the external of the lighting unit 1000 being indicated with reference 5.

Reference 201 indicates the first louvre cell opening, where light can enter the louvre cell 210, and reference 202 indicates the second louvre cell opening, from which lighting unit light may escape.

Figure 1C:
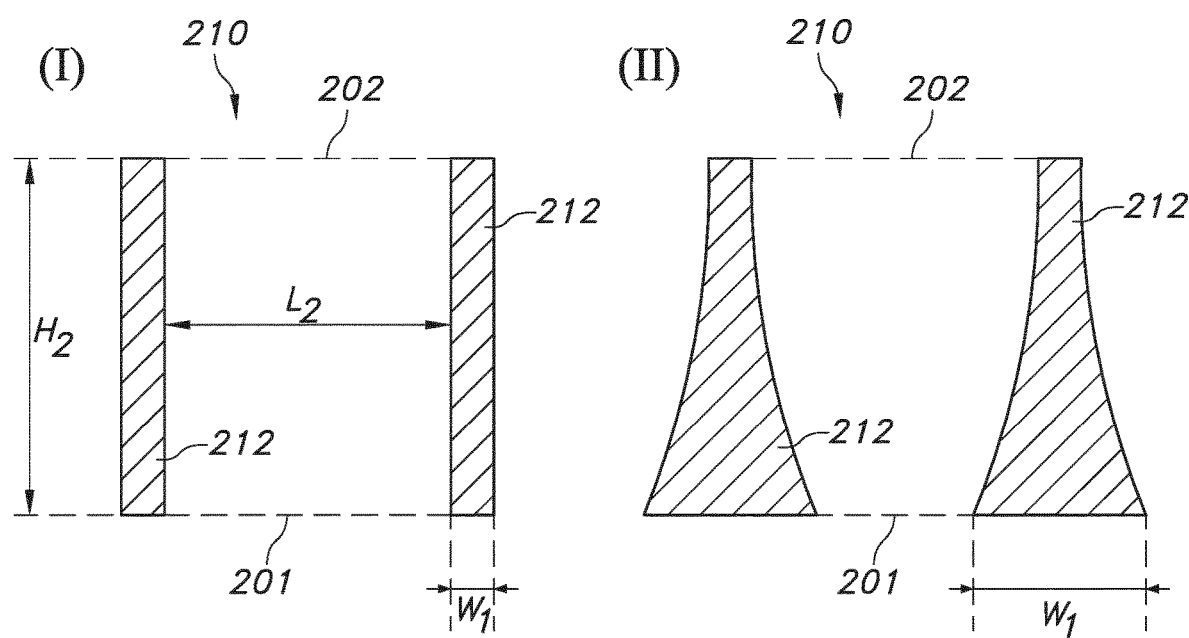

FIG. 1*c* schematically depicts a non-limiting number of possible louvre cells 210, with embodiment I showing a louvre cell 210 with straight louvres or walls 212 (along the height) and with embodiment II showing a louvre cell 210 with tapering walls 212. The surface of the walls may be reflective. For instance, the walls may be of aluminum or may have an aluminum coating, or other reflective material or other reflective coating. (see also above for reflective materials). The walls may comprise thermally conductive material. The width of the wall is indicated with W1. As shown in FIG. 1*c*, embodiment 1, the Length L2 or equivalent diameter of the louvre cell 210 is constant over the height. In the other schematically depicted embodiment II, the equivalent diameter increases with increasing distance from the first louvre cell opening 201. Here, the walls 212 are tapering; this may assist in beam shaping the lighting unit light (beam). The tapering is from the second louvre cell opening 202 in the direction to the first louvre cell opening 201, with the second louvre cell opening 202 being downstream of the first louvre cell opening having a larger cross-section than the first louvre cell opening 201.

Figure 2A:
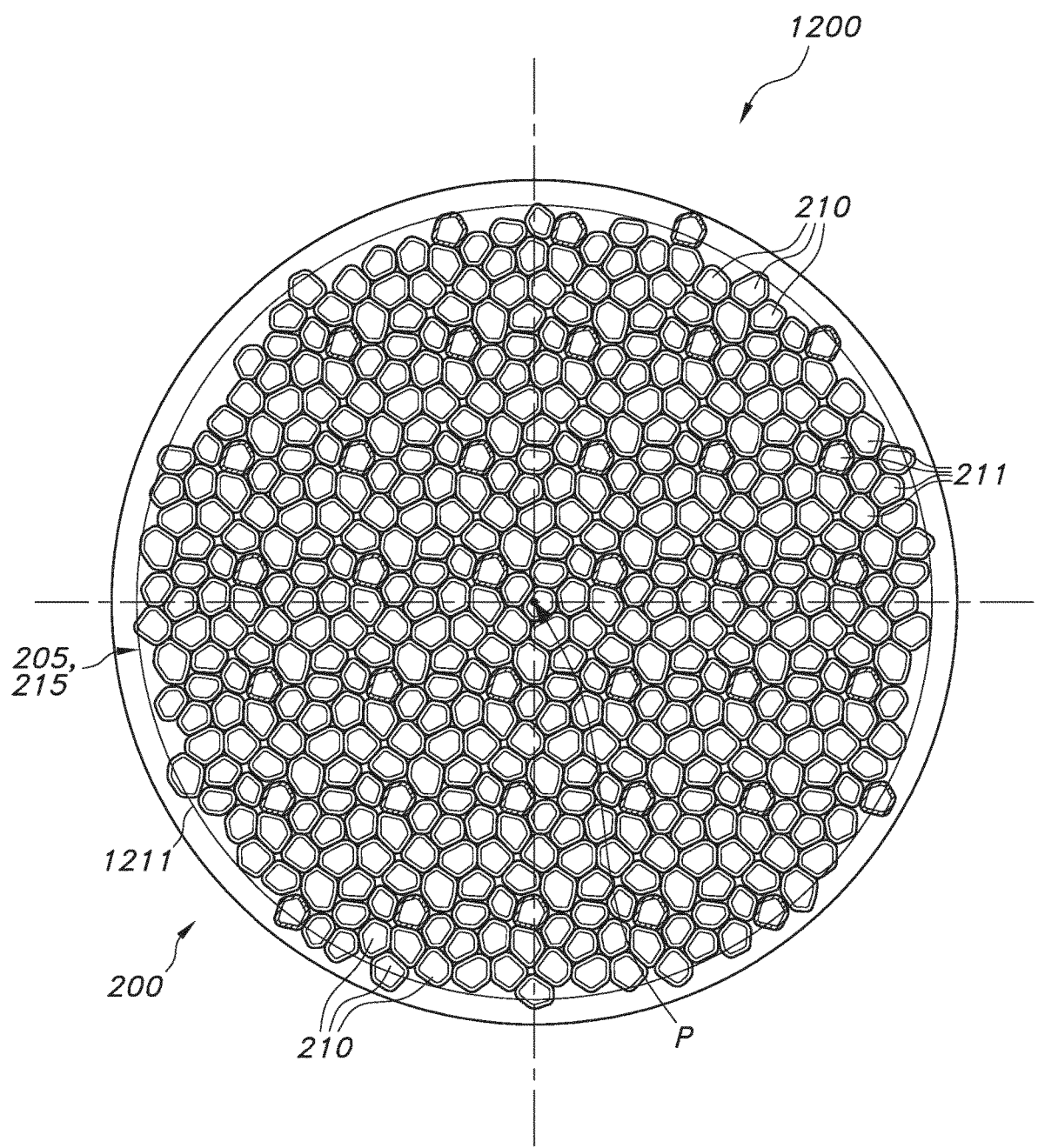
Figure 2B:
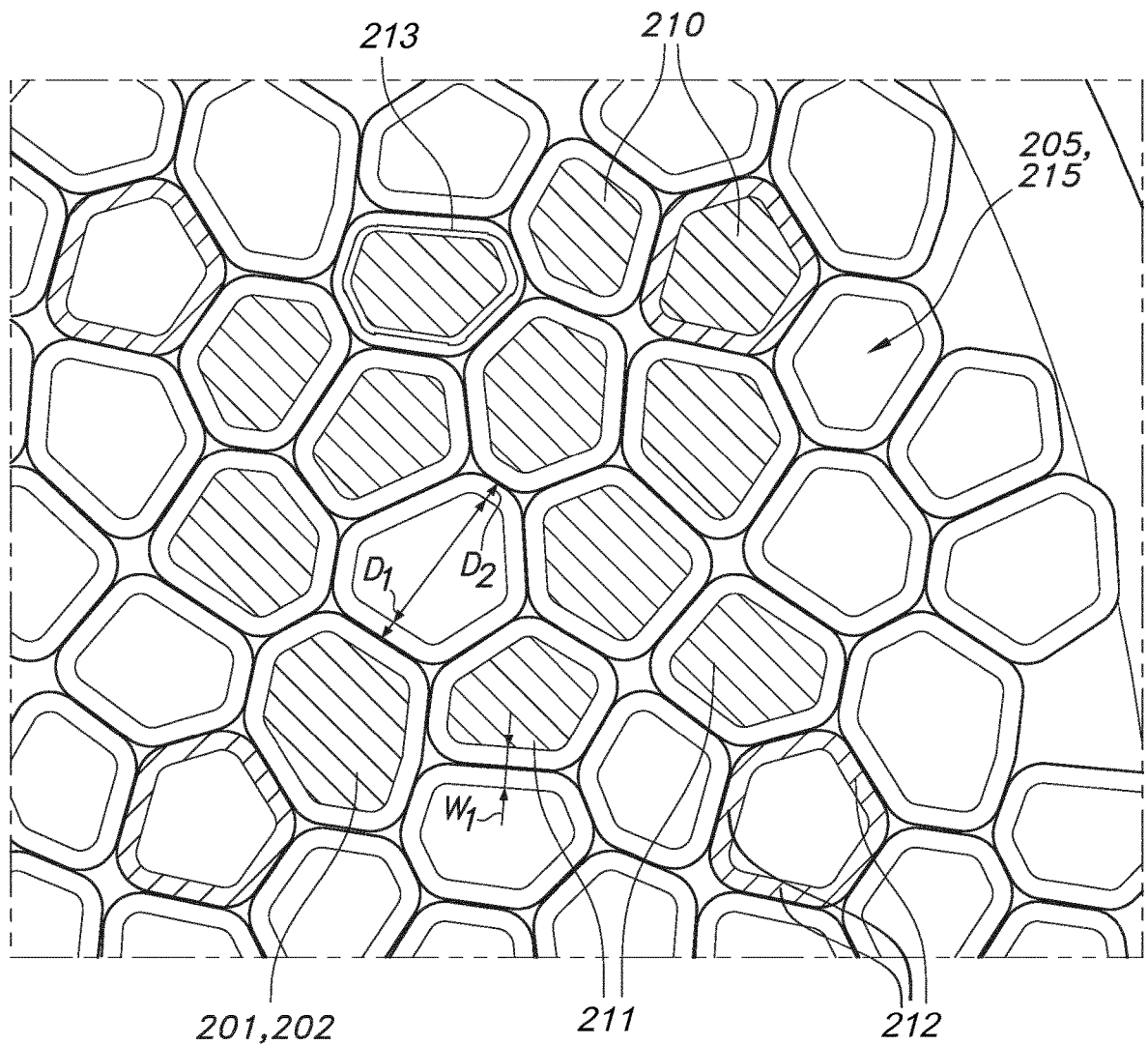

FIGS. 2*a* and 2*b* schematically depict in top view embodiments of the light exit unit 200 which can be used to create a lighting unit. The plurality of louvre cells 210 comprises a plurality of n subsets 205 each comprising a respective plurality of m louvre cells 210, wherein the louvre cells 210 of each subset 205 are configured as domain 215 of adjoining louvre cells 210, wherein a respective plurality of k louvre cells 210 within each domain 215 have mutually differing louvre cell cross-sections 211. As indicated above, especially $3 \le n \le 100000$, wherein $5 \le m \le 21$, and wherein $5 \le k \le m$.

As can be seen in FIG. 2*a*, a substantially regular pattern of domains 215 is created; the hatched louvre cells 210 indicate the pattern of domains 215. In fact, there is only C1 symmetry relative to a central point P. A domain is also shown in more detail in FIG. 2*b*. Here, also the tapering is visible. By way of example the first equivalent diameter D1 and the second equivalent diameter D2 is depicted, but these may not be to scale. The width of the louvre walls is indicated with W1. This width W1 may vary over the height, with D1<D2.

In FIGS. 2*a*-2*b*, the domains are ordered in a substantially regular structure. In such embodiments, all domains may substantially be equal, with within each domain a plurality of louvre cells having mutually different cross-sections. In these figures all louvre cells within a domain have mutually differing cross-sections, i.e. each louvre cell cross-section differs from all cross-sections of all other louvre cells within the domain. As can be seen in FIGS. 2*a*-2*b*, a pebble-plate like louvre is obtained, with louvre cells configured in a kind of pebble arrangement or structure. In FIGS. 2*a*-2*b*, k=m.

As can be seen in FIGS. 2*a*-2*b*, the louvre unit 1200 comprises a 2D array of louvre cells, the louvre cells are formed as irregular polygons, each domain comprising at least three polygons having a different number of louvre walls 212, i.e. 5-sided, 6-sided and 7-sided polygons. The louvre walls 212 form a closed loop 213. The louvre cells are agglomerated, forming in the schematically depicted embodiments agglomerates of substantially identical domains. Here, the term 2D array does thus not necessarily refer to a regular array. In contrast, it may (also) refer to an array of louvre cells that form an irregular pattern (of the domain). The second louvre cell openings (here seen from above) may thus be configured in a 2D array, which especially provides a light emitting surface during use of the lighting unit.

The term "substantially" herein, such as in "substantially all light" or in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of". The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention further applies to a device comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A louvre unit comprising a plurality of louvre cells for beam shaping a lighting unit light, wherein the plurality of louvre cells comprises a plurality of n subsets each comprising a respective plurality of m louvre cells, wherein the louvre cells of each subset are configured as a domain of adjoining louvre cells, wherein a respective plurality of k louvre cells within each domain have mutually differing louvre cell cross-sections, wherein $3 \leq n \leq 100000$, wherein $5 \leq m \leq 21$, and wherein $5 \leq k \leq m$,
   wherein the louvre cells are formed as polygons bounded by a number Ne of louvre walls closing in a loop, wherein for each louvre cell the number Ne is in the range of $3 \leq Ne \leq 10$,
   wherein the plurality of louvre cells within the same domain only have C1 symmetry relative to a central point in said domain and each domain comprises at least three polygons of incongruent shape, and
   wherein each louvre cell has a respective equivalent cross section, said equivalent cross section being a cross section of a circle having the same cross sectional area as the polygonal shape of the louvre cell, and wherein a ratio between equivalent cross-sections of louvre cells is in the range of 1:2.5.

2. The lighting unit comprising a plurality of LED light sources for generation of lighting unit light, and a light exit unit for escape of at least part of said lighting unit light from the lighting unit, wherein the light exit unit comprises a louvre unit according to claim 1, the louvre unit being arranged in a light exit first face.

3. The lighting unit according to claim 2, wherein each of the domains are regularly arranged in the light exit first face.

4. The lighting unit according to claim 2, comprising a light mixing chamber, wherein the plurality of light sources are configured to provide light source light in the light mixing chamber which in turn provides said lighting unit light, wherein the light mixing chamber comprises as the light exit first face a light exit face for escape of the light source light from the light mixing chamber, wherein the light exit face is comprised said light exit unit or wherein said light exit unit is configured downstream of said light exit face.

5. The lighting unit according to claim 4, wherein an air guide is configured as the light mixing chamber, and wherein the light exit face is comprised in said light exit unit.

6. The lighting unit according to claim 4, wherein a waveguide is configured as the light mixing chamber, wherein the waveguide comprises said light exit face, and wherein said light exit unit is configured downstream of said light exit face.

7. The lighting unit according to claim 4, wherein the light mixing chamber comprises one or more faces and an edge face, with the light mixing chamber having a height smaller than a first length of the light mixing chamber.

8. The lighting unit according to claim 7, and wherein the light mixing chamber has a ratio of the first length to the height of $5 \leq L1/H \leq 100$.

9. The lighting unit according to claim 7, wherein the plurality of light sources are configured at the edge face and are configured to provide said light source light having an optical axis transverse to the height.

10. The lighting unit according to claim 7, wherein at least one of the one or more faces comprises elements configured to redirect light source light within the light mixing chamber.

11. The lighting unit according to claim 2, wherein the louvre cells are configured in a pseudo random pattern or in a phyllotaxis pattern.

12. The lighting unit according to claim 2, wherein the louvre cells are tapering from a second louvre cell opening in the direction to a first louvre cell opening, with the first and second louvre cell opening having a ratio R12 in the range of 0.5-1.1 and R12≠1.

13. The lighting unit according to claim 2, wherein the lighting unit comprises at least 10 light sources, wherein the light sources comprise solid state light sources, wherein the louvre cells have louvre heights selected from the range of 1-100 mm, wherein the light exit unit has a cross-sectional area, wherein the light exit unit comprises in the range of 0.05-10 louvre cells per cm' cross-sectional area, wherein a part of the light exit unit occupied by the louvre walls defined by adjoining louvre cells is selected from the range of 9-17% of the cross-sectional area.

14. The lighting unit according to claim 2, having a lighting unit length (L3) and a lighting unit height (113) with a ratio of the lighting unit length to the lighting unit height of 5≤L3/H3≤100.

15. The lighting unit according to claim 2, wherein the louvre cells have a height H2 and an equivalent diameter L2, with a ratio of H2/L2 being ≥0.5.

16. The lighting unit according to claim 2, wherein the louvre cells have a height H2 and an equivalent diameter L2, with a ratio of H2/L2 being ≥0.8.

17. The lighting unit according to claim 2, wherein the louvre cells have a height H2 and an equivalent diameter L2, with a ratio of H2/L2 being ≥1.2.

* * * * *